April 4, 1939. J. I. GUTKOWSKI 2,153,506
EMERGENCY BRAKE CONTROL
Filed Dec. 23, 1937
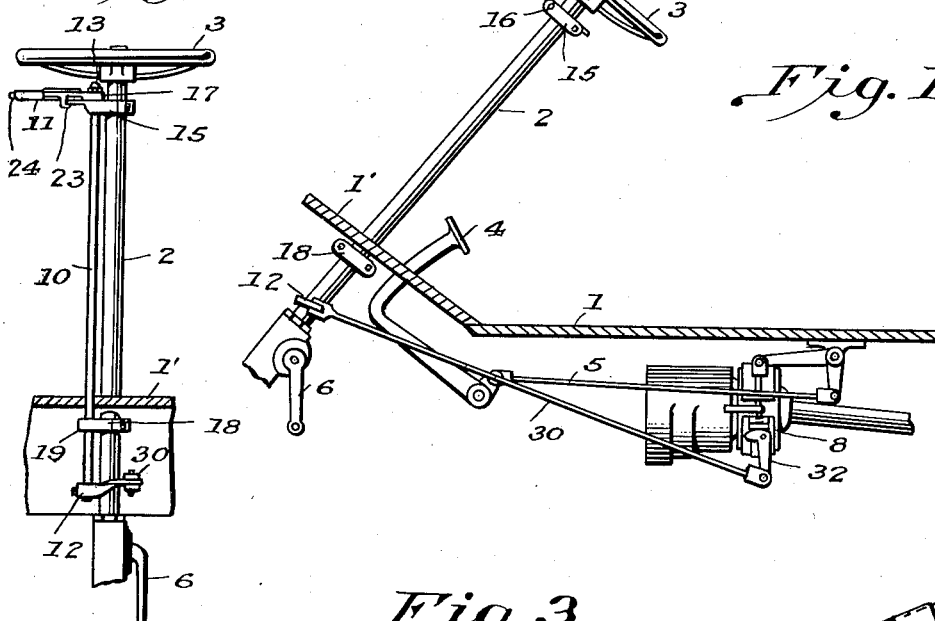
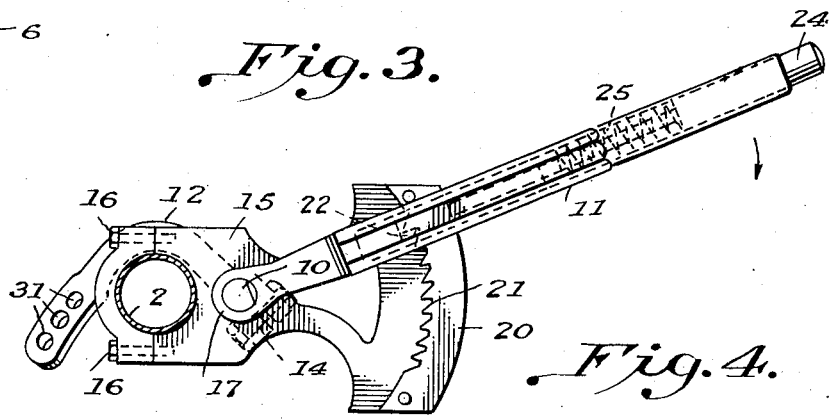
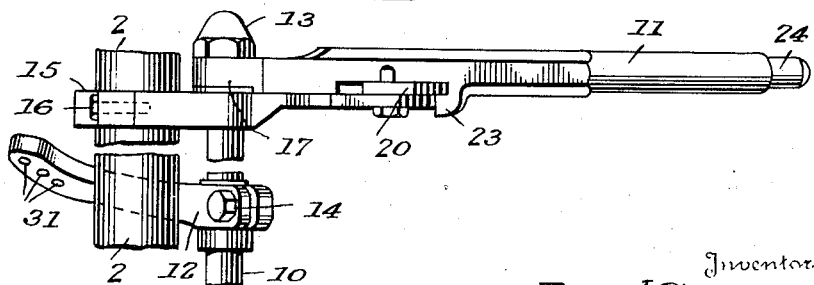
Inventor.
JOHN I. GUTKOWSKI
By Samuel Lebowitz
Attorney Patented Apr. 4, 1939

2,153,506

UNITED STATES PATENT OFFICE 2,153,506

EMERGENCY BRAKE CONTROL

John I. Gutkowski, Jersey City, N. J.

Application December 23, 1937, Serial No. 181,405

1 Claim. (Cl. 74—485)

This invention relates to a braking system for vehicles such as automobiles and more particularly to an emergency brake control therefor.

It is the object of the present invention to provide an emergency control for vehicles which is rugged in construction, easy to manipulate and conveniently accessible for the purpose of controlling vehicle brakes by hand, particularly at times of emergency when it is necessary to bring the vehicle to a quick stop.

Difficulty has been experienced heretofore in the use of emergency brakes by virtue of the location of the emergency brake lever in a place requiring the diversion of the driver's attention from the task of operating and steering the automobile at a time when that attention is needed most. It is the object of the present invention to locate the emergency brake control lever below the steering wheel of the vehicle so that this lever may be operated quickly and certainly without requiring the operator of the vehicle to turn his eyes away from the road or feel for the emergency lever in some other part of the vehicle.

It is a further object of the invention to provide an emergency brake control embodying a transmission mechanism from a conveniently accessible point to the emergency brake rod which may be conveniently disposed in either new cars or in presently existing cars at low cost without impairing the certainty of operation of such a brake control system.

Other objects and purposes will appear from the more detailed description of the invention following hereinafter taken in conjunction with the accompanying drawing, wherein:

Figure 1 is a front elevation showing generally the brake system disclosed herein;

Figure 2 is a left elevation of Figure 1;

Figure 3 is a plan view of the assembly; and

Figure 4 is a front elevation of Figure 3.

In Figure 1 is shown a conventional frame 1 of an automobile vehicle embodying as a part thereof a steering column 2, extending through the floor-board 1', having a steering wheel 3 at the upper end thereof and extending downwardly through the chassis, from which steering column connection 6 is made for the purpose of steering the automobile vehicle. A foot brake 4 is shown connected with a brake rod 5 which controls the braking system 8 of the automobile as disclosed in detail in the brake system shown in the Smith Patent No. 1,775,872, September 16, 1930. This brake system is not described in detail for the present invention is not concerned with the details thereof and is applicable to any brake system embodying an emergency brake control.

A control shaft 10 is provided for the purpose of actuating the emergency brake by the movement of the brake rod 30 and the consequent actuation of the brake cam lever 32. This shaft 10 is mounted adjacent to the steering column 2 by means of brackets rigidly mounted thereupon. In the illustrated embodiment of the invention, a metallic bracket 15 is shown mounted upon the steering column by the clamping thereupon of two cooperating sections of the bracket 15 by means of bolts 16. A cylindrical bearing bush 17 which may be of different metal than the metal of the bracket, is provided for the reception of the control shaft 10. This bearing bush may be made of brass or any other suitable metal. Another bracket 18 is shown mounted on the steering column 2 having a bearing 19 for the lower end of the control shaft 10. Any number of such brackets may be disposed as are considered necessary to obtain a strong and effective guiding of the control shaft 10.

A manually operable lever corresponding to an emergency brake lever is disposed below the steering wheel 3 and is connected with the control shaft 10, as by a capped nut 13, to execute the rotation of the shaft 10. Preferably this emergency brake control lever extends beyond the boundary of the steering wheel and is operable in a plane substantially perpendicular to the axis of the control shaft. The lever 11 has incorporated therein a pawl element 22 which may be moved against the action of a spring 25 on the interior of the lever by the manipulation of the lug 24 at the extremity thereof. The bracket 15 is provided with an extension 20 having ratchet teeth 21 thereon cooperating with the pawl 22, permitting a movement of the lever 11 in a clockwise direction but preventing a reverse movement of the lever without first releasing the pawl 22 from the field of operation of the ratchet teeth 21 by the manipulation of the lug 24. The ratchet segment 20 may be formed integrally with the bracket 15. To aid the guiding movement of the lever on the bracket 15, an inturned flange 23 is formed on the lever for embracing a limited portion of the lower face of the ratchet segment 20. This mechanism serves to make possible a quick and convenient manipulation of the lever 11 for the purpose of rotating the control shaft 10 for applying the emergency brakes, which setting remains fixed until the brakes are released by a return of lever 11 following a release of the pawl 22 by the lug 24. Of course these movements may be executed when the vehicle is either stationary or moving.

In order that the emergency brake control system present no interference to the existing arrangement of other elements in the motor car, a bowed elbow lever 12 may be mounted at the lower end of the control shaft 10 by means of bolts and nuts 14. Apertures 31 in this lever provide adjustable points of connection of the emergency brake rod 30 to the lever 12. The intermediate portion of the lever is bowed in order to present no interference to the location of the steering column. As shown in Figure 3, a downward movement of the lever 11 causing a rotation of the shaft 10 in a clockwise direction gives rise to rocking movement of the lever 12 in a direction away from the steering column 2 and causes a tensioning of the emergency brake rod 30 which in turn controls the emergency brake cam lever 32 in the conventional manner. The lever 11 is formed in such planes that a tight connection thereof with the control shaft may be made while permitting a direct pull to be exercised therewith on the brake rod 30.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claim.

What I claim is:

In a brake system for a vehicle having a steering column inclined to the vertical with a steering wheel at the upper end thereof, an emergency brake control shaft adjacent to said steering column and extending in parallel thereto, a bearing bracket rigidly mounted on said steering column and fitted with a bearing for said control shaft, an emergency brake lever connected to the upper end of said shaft below the steering wheel and extending beyond the boundary thereof and operable in a plane substantially perpendicular to the axis of said shaft to rotate said shaft, a ratchet on said bracket within the field of movement of said lever, a manually releasable pawl on said lever in engagement with said ratchet for holding said shaft in its actuated position, an elbow lever having one end thereof connected to the lower end of said shaft provided with a plurality of apertures at the other end thereof, said lever being bent around a portion of the periphery of the steering column to dispose the apertures therein at points spaced from the axis of rotation of said control shaft, and an emergency brake rod selectively engaging one of said apertures in said elbow lever.

JOHN I. GUTKOWSKI